Figure 3:
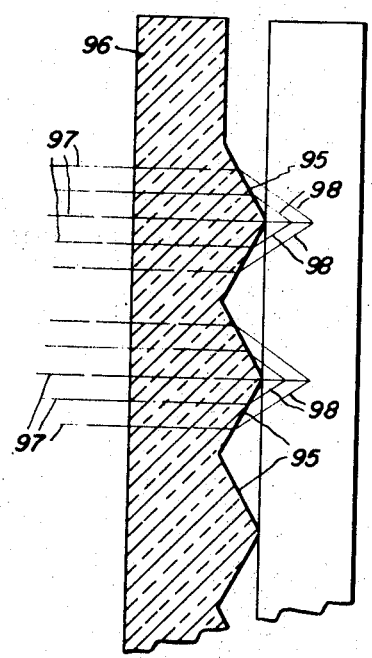

United States Patent

[11] 3,533,339

[72] Inventor: John E. Bigelow
Niskayuna, New York
[21] Appl. No. 639,427
[22] Filed May 18, 1967
[45] Patented Oct. 13, 1970
[73] Assignee General Electric Company
a corporation of New York

[54] COLOR DISPLAY SYSTEM AND METHOD EMPLOYING LIGHT SENSITIVE RECORDING MATERIAL
9 Claims, 6 Drawing Figs.
[52] U.S. Cl. .................................................. 95/12, 355/4, 355/9
[51] Int. Cl. ........................................................ G03b 29/00
[50] Field of Search .......................................... 95/12; 355/33, 4, 9

[56] References Cited
UNITED STATES PATENTS
3,270,613 9/1966 Glenn ............................ 346/77
3,316,805 5/1967 Gary ............................... 355/33

Primary Examiner—John M. Horan
Assistant Examiner—Richard M. Sheer
Attorneys—Paul A. Frank, Richard R. Brainard, John J. Kissane, Frank L. Neuhauser, Oscar B. Waddell and Melvin M. Goldenberg ABSTRACT: Under the direction of a computer controlling a color display, selected character images are generated at chosen locations upon a cathode ray tube and suitable lenses are provided to project the character images upon a photoconductive thermoplastic slide through one of a plurality of rotatably mounted lenticular screens having triangularly shaped lenses. The period and/or direction of the triangular lenses of each of the plurality of lenticular screens is diverse to form distinctly disposed line patterns of light for various colors and a color control signal from the computer mechanically interchanges the lenticular screens dependent upon the color component desired for a selected character image. The light rays from the character images produced by the cathode ray tube are dissected into a line pattern of light by the refraction action of the triangular lenses forming the lenticular screens and the photoconductive thermoplastic slide is deformed in the region of impingement of the line patterns of light to form cycles of ripples having a spacing and/or angular attitude dependent upon the lenticular screen utilized. The deformed photoconductive thermoplastic slide then is fed to a color projection system wherein the deformed slide functions as a diffraction grating to produce color displays. Sinusoidally shaped lenticular screens or selectively masking screens also can be employed to dissect the light rays from the cathode ray tube images into color patterns.

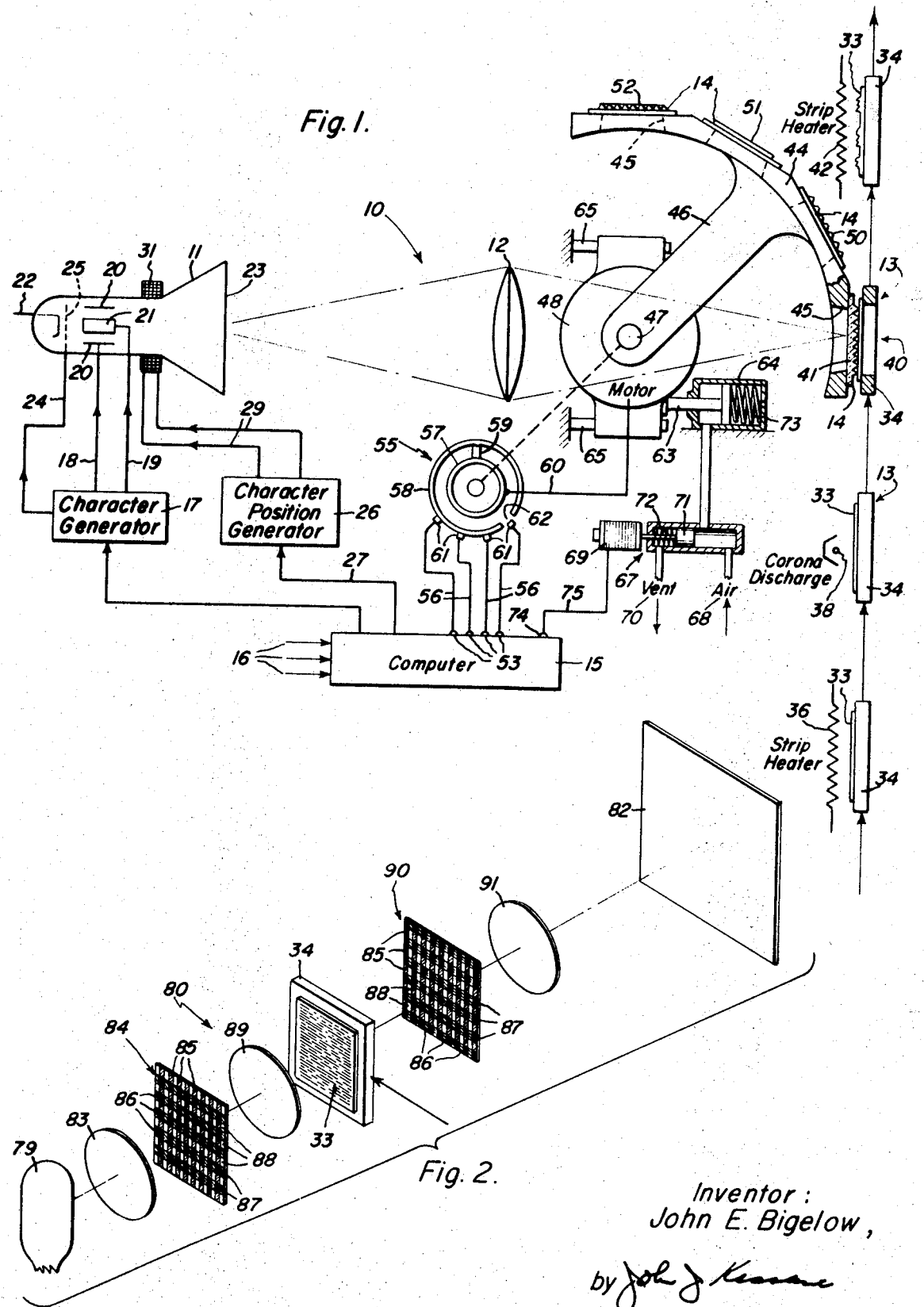

Inventor:
John E. Bigelow,
by John J. Kinane
His Attorney.

COLOR DISPLAY SYSTEM AND METHOD EMPLOYING LIGHT SENSITIVE RECORDING MATERIAL

THE DISCLOSURE

This invention relates to a color display system and method utilizing a light sensitive medium and more particularly to a color display system and method having light dissecting screens in the optical path of a projected image to form line patterns of light rays on the light sensitive medium at a disposition, e.g. either a spacing or an attitude, corresponding to a desired color component.

The portrayal of information in diverse colors to enhance both the ease and speed of comprehending visual information contained in a continuously changing display often is desirable and a variety of color display systems have been devised to accomplish color portrayals. One such color display system, as disclosed in U.S. Pat. No. 3,270,613 granted to W. E. Glenn, Jr. on Sept. 6, 1966 and assigned to the assignee of the present invention, encompasses the diffraction of projected polychromic light by orthogonally directed diffraction gratings formed in a deformable thermoplastic by the traversal of an electron beam and the selective screening of light rays of various colors by masks situated on opposite sides of the diffraction grating. However, the writing of color information into a deformable thermoplastic by an electron beam established charge pattern often is not practical in many proposed utilizations because of the vacuum environment usually used for electron beam writing.

Because light sensitive recording films do not require a vacuum and have been successfully utilized to display monochromic information, many proposals heretofore have been made to utilize light sensitive recording film for color displays. In one such prior proposal, a separate photoconductive thermoplastic recording slide is deformed for each primary color component and a color display is obtained by the simultaneous projection of light through the deformed slides utilizing suitable color filters. Color displays utilizing individual photoconductive thermoplastic recording slides however are deficient not only because of increased material usage but also because of increased recording and projection problems encountered in properly positioning information on the individual recording slides. The positioning problem is especially acute when a single image source is utilized to write information on more than one recording slide. Furthermore, when the size of the recording slide is limited, division of the recording slide into individual color segments necessitates increased resolution in the information writing and color projection systems of the color display.

It is therefore an object of this invention to provide a novel method of producing color displays utilizing light sensitive recording film.

It is also an object of this invention to provide a light screening system for writing color information upon light sensitive recording film.

It is a further object of this invention to provide a high efficiency method of optically writing color information on light sensitive recording film.

It is a still further object of this invention to provide a relatively simply constructed color display system utilizing light sensitive recording film.

These and other objects of this invention generally are accomplished by positioning means intermediate a projected image and a light sensitive medium to split the light rays from the image into a line pattern having a disposition e.g. either a spacing or an attitude, dependent on the color component desired. Thus an apparatus for producing color displays in accordance with this invention generally comprises an image source, a light sensitive medium, means for projecting the image source upon the light sensitive medium, means positioned intermediate the image source and the light sensitive medium to split light from the image source into a line pattern of light rays operative upon the light sensitive medium to form cycles of modulation having a disposition corresponding to the color component desired and means for projecting light through the cycles of modulation to display the image in color. When the light sensitive medium is a deformable material, the cycles of modulation are ripples formed within the material and a phase modulation of light rays passing therethrough is effectuated. A modulation of the intensity of the projected light is produced when the cycles of modulation are sections of diverse transparency in a selectively darkenable medium. Preferably the means for splitting light rays from the image source into a line pattern of light are a plurality of screens e.g. a screen for each primary color component desired for the display, and the screens are individually positioned in an abutting attitude with the light sensitive medium dependent upon the display color desired for a particular image. Because monochromic images can be projected in various colors merely by an external variation of light rays from the monochromic image source, complicated electronic controls to produce variations in the image source for each desired color are not required.

The features of the invention believed to be novel are set forth with particularity in the appended claims.

Figure 4:
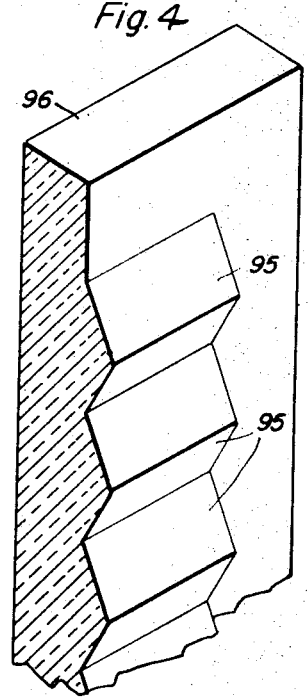
Figure 5:
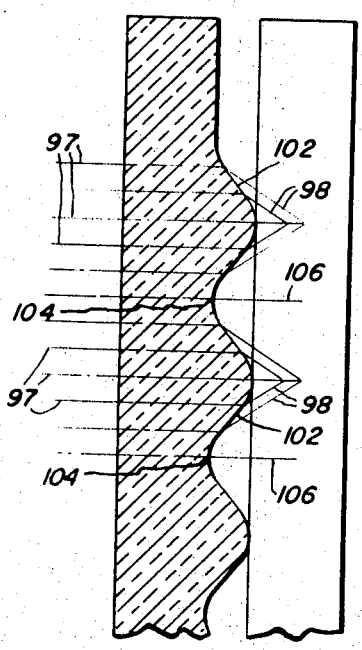
Figure 6:
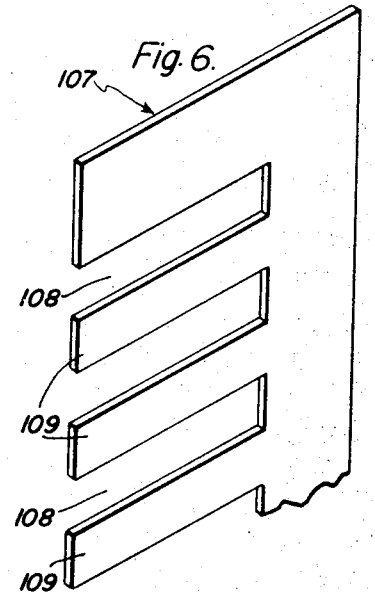

The invention itself, however, both as to organization and method of operation, together with further objects and advantages thereof, may best be understood by reference to the following description taken in conjunction with the accompanying drawings in which:

FIG. 1 is a schematic plan view of the color information writing apparatus of this invention for producing color oriented modulation cycles in light sensitive slides, FIG. 2 is a color projection system using deformed photoconductive thermoplastic slides as a diffraction grating, FIG. 3 is an enlarged sectional view of a lenticular screen suitable for dissecting a light image into a line pattern of light, FIG. 4 is an isometric view of the lenticular screen section of FIG. 3, FIG. 5 is a sectional view of a second lenticular screen suitable for splitting a light image into a line pattern of light, and FIG. 6 is an isometric sectional view of a selectively masking screen suitable for utilization in the color information writing apparatus of this invention.

The color information writing apparatus 10 of this invention is depicted in FIG. 1 and generally includes a source for the production of a light image, such as cathode ray tube 11, and a lens unit 12 for focusing the light image upon a light sensitive medium 13 through one of a plurality of lenticular screens 14. A computer 15, into which information from a plurality of diverse intelligence sources (not shown) is fed by means of leads 16, functions as a supervisory control to govern the overall operation of color information writing apparatus 10. In response to signals from the intelligence sources, pulses determinative of the specific images to be formed upon the face of cathode ray tube 11 are fed to character generator 17 thereby actuating the character generator to produce output voltages which are applied through external leads 18 and 19 to horizontal and vertical electrostatic deflection plates 20 and 21, respectively, situated within the neck of cathode ray tube 11. The applied voltage upon the electrostatic deflection plates exerts a rapid directional control over an electron beam produced by cathode 22 to trace a desired numeral, letter or figure upon the front face 23 of cathode ray tube 11. A third output from character generator 17 is fed through lead 24 to a control grid 25 within the neck of the cathode ray tube proximate cathode 22 to regulate the intensity of the electron beam. Thus the specific geometric configuration of the character image produced by the sweep of the electron beam across front face 23 of cathode ray tube 11 is controlled by the voltage on horizontal and vertical deflection plates 20 and 21, respectively, while control grid 25 initiates and terminates the flow of electrons from cathode 22 at the limits of the character image.

The specific location of the character image upon the front face of cathode ray tube 11 generally is determined by a character position generator 26 under the supervision of computer 15. Upon receipt of a given output signal from the computer through lead 27, character position generator 26 produces an output voltage which is applied through external leads 29 to deflection yokes 31 circumferentially embracing the neck of cathode ray tube 11 to deflect the electron beam forming the character image to the desired location upon the front face 23 of the cathode ray tube. The deflection voltage applied to yokes 31 generally has a period greater than the period of the voltage signal applied to deflection plates 20 and 21 because a plurality of electron beam strokes are required to completely form a character image at a single given location on the front face 23 of cathode ray tube 11. Although the preferred apparatus for forming the character image of the color display is by the utilization of a cathode ray tube, any other suitable method of producing a light image, such as the transmission of light through a stencil, can be utilized to write color information on a light sensitive medium in accordance with the broader aspects of this invention.

Light sensitive medium 13 which forms the light modulating medium in the color projection system of FIG. 2 preferably comprises a slide of photoconductive thermoplastic recording material 33 affixed within a frame-like apertured slide holder 34 by suitable mechanical means (not shown). The photoconductive thermoplastic recording material generally is prepared by synthesis of photoconductive, thermoplastic polymers and by solution or dispersion of organic or inorganic photoconductors in inert thermoplastic matrices. The photoconductive polymers are synthesized by chemical modification of light insensitive polymers and by polymerization of photosensitive aromatic hydrocarbons. If the polymer has too high a melt viscosity, inert materials can be added to give the desired flow characteristics. Among the organic compounds dissolvable in thermoplastic polymers to produce photoconductive thermoplastic slides are phenazine, phenothiazine, $\beta$-carotene, and carbazole. A more complete description of photoconductive thermoplastic materials suitable for use in this invention may be obtained with reference to U.S. Pat. No. 3,291,601, issued to Joseph Gaynor and assigned to the assignee of the present invention. Although light sensitive medium has been specifically described as a photoconductive thermoplastic material in the preferred embodiment illustrated, non-deformable, selectively darkenable materials such as silver halide, Kalvar and photochromic materials also can be utilized as light sensitive medium 13.

Because photoconductive thermoplastic material can be erased after completion of a color projection to remove the deformations written into photoconductive thermoplastic slide 33, a continuous cycle of recording deformations, projecting through the deformations and erasing the deformations may be utilized in the color display device of this invention. Thus photoconductive thermoplastic slide 33, after serving as a diffraction grating in the color projection system of FIG. 2, can be returned to the color information writing apparatus of FIG. 1, and be passed proximate a strip heater 36 to soften the surface of the photoconductive thermoplastic slide thereby allowing the surface tension of the molten thermoplastic to erase deformations which had previously been formed in the slide. The smooth surface of photoconductive slide 33 then is advanced to a position proximate a partially shielded corona discharge wire 38 to charge the surface of slide 33 to a positive voltage of approximately 1000 to 1500 volts. Although the surface of the photoconductive thermoplastic slide could be charged negatively, if desired, a positive charge is preferred because of the superior stability of positively charged thermoplastic surfaces.

After the corona charge has been placed on the surface of the photoconductive thermoplastic slide, slide 33 is moved to a location 40 where the character images formed on front face 23 of cathode ray tube 11 are focused upon the surface of the slide both by lens 12 and by the triangular lenses forming lenticular screen 41 to selectively discharge the surface of the photoconductive thermoplastic slide at the points of impingement of the light rays. The selectively discharged photoconductive thermoplastic slide then is passed proximate strip heater 42 to melt (to a viscous liquid state) the thermoplastic and permit a electrostatic forces to deform the selectively discharged surface of the slide into a series of ripples having an amplitude proportional to the intensity of the focused light rays effectuating the selective discharge.

The color control portion of this invention generally comprises a plurality of lenticular screens 14 mounted upon an upwardly extending arcually shaped frame 44. Screens 14 lie in an overlying attitude relative to a plurality of windows 45 situated within the frame to permit the passage of light rays therethrough. The lower portion of frame 44 is fixedly attached to one end of a drive arm 46 while the other end of the drive arm remote from the frame is apertured to be fixedly received upon drive shaft 47 of motor 48. Upon actuation of motor 48, frame 44 is rotated by shaft 47 to position a selected lenticular screen 14 in the optical path of the light from the character image formed on cathode ray tube 11. Motor 48 and drive arm 46 are situated behind the optical path, as determined principally by lens unit 12, in order not to obstruct projected light rays from cathode ray tube 11 while the outward extension of frame 44 permits screens 14 to be situated within the optical path of the projected character image.

In the configuration depicted in FIG. 1, four separate lenticular screens preferably having triangularly shaped lenses are utilized, e.g. one for each primary color and one for white. Thus a first lenticular screen 41 has a triangular lens spacing for splitting impinging light rays from cathode ray tube 11 into a line pattern of light having a spacing (as will be described in connection with FIGS. 3 and 4) suitable for the subsequent projection of red character images, while the period of the triangular lenses forming a second screen 50 differs slightly from that of screen 41 to subsequently projected blue character images upon a display screen. In order to inhibit the formation of a beat pattern between red and green light rays during projection, the linear direction of the triangular lenses forming green screen 51 is orthogonal relative to the linear direction of the triangular lenses forming red and blue screens 41 and 50, respectively. A fourth screen 52 is provided with triangular lenses lineated both in the horizontal and in the vertical direction to diffract impinging light into horizontal and vertical line patterns for the subsequent projection of white light.

To write color information on slide 33, computer 15 generates selected pulses which are fed to character generator 17 and character position generator 26 to produce a chosen character image at a selected position upon the face of cathode ray tube 11. Simultaneously with or prior to the production of the chosen character image, a signal is generated upon one of four output terminals 53 of computer 15 dependent upon the desired color for the chosen character image and the signal on the energized output terminal is applied to color control circuitry, depicted specifically as a slip ring motor control 55, through the corresponding lead 56 connected to energized terminal 53.

Slip ring motor control 55 includes an inner continuous slip ring 57 mechanically interlocked to the shaft of motor 48 and an outer interrupted slip ring 58 mechanically and electrically connected to the continuous slip ring by contact 59. The coils of motor 48 are energized by an external lead 60 connected to the continuous slip ring portion 57 of slip ring motor control 55 by suitable means, such as brushes, while leads 56 are electrically connected to interrupted slip ring 58 by contactors 61 arcually disposed about the outer periphery of the interrupted slip ring. The dimensions of contactors 61 must be small relative to the dimensions of the discontinuity 62 in the interrupted slip ring to assure an interruption of current from the contactor when the discontinuity is registered with the contactor.

To rotate the proper lenticular screen into the optical path of the image, the output terminal 53 corresponding to the desired color is energized with an electrical potential by computer 15 and the electrical potential of the energized output terminal is applied to interrupted slip ring 58 by the corresponding contactor 61 and lead 56 electrically connected to the energized output terminal. The potential applied to the interrupted slip ring then is fed to the windings of motor 48 through contact 59, continuous slip ring 57 and lead 60 to rotate motor 48 until the discontinuity in interrupted slip ring 58 is registered with the energized contactor 61 thereby interrupting current flow to the motor coils from the energized computer terminal. Lenticular screen 14 are positioned relative to the location of contactors 61 along interrupted slip ring to situate the proper lenticular screen in the optical path of the image upon the termination of current flow to motor 48 by the registration of the energized contactor with the discontinuity in the interrupted slip ring.

Although the rotation of frame 44 has been described as controlled by a slip ring motor control 55 mechanically interlocked to the shaft of motor 48, any other suitable method of selectively rotating the frame, e.g. by the application of current pulses of varied duration and/or polarity to rotate motor 48 a given arcual distance, also can be employed to interchange lenticular screens 14. By positioning the chosen lenticular screen in an aligned and abutting attitude with slide 33, a proper focusing of impinging light by the triangularly shaped lenticular lenses forming the screen upon slide 33 is assured.

In order to inhibit both the abrasion and the discharge of slide 33 by the rotary effect of the lenticular screens against the surface of the slide, suitable means, such as air driven piston 63 slidably received within air cylinder 64, are provided to position the lenticular screen in an abutting position with the slide only after the lenticular screens have been changed. To effectuate this result, the housing of motor 48 is mounted upon horizontally disposed guide bars 65 thereby permitting motor 48 and attached frame 44 to reciprocate perpendicularly relative to the planes of slides 33. A dual acting solenoid valve 67 under the control of computer 15 is situated between a pressurized source of air 68 and air cylinder 64 to admit air to the air cylinder chamber upon receipt by solenoid 69 of an actuating signal from computer 15 and to communicate the air cylinder chamber to vent 70 when solenoid 69 is deenergized and plunger 71 is returned to a rightward position by biasing spring 72. Thus when solenoid 69 is deenergized, air cylinder 64 is vented through solenoid valve 67 and compressed spring 73 in air cylinder 64 biases piston 63 and motor 48 to a leftward position thereby positioning attached frame 44 and lenticular screens 14 in a nonabutting attitude with slides 33.

After the proper lenticular screen for a selected image color has been rotated into the optical path of the image and immediately prior to the generation of the character images upon cathode ray tube 11, a signal is generated upon output terminal 74 of computer 15 and the generated signal is conducted to solenoid 69 by external conductor 75 to slide solenoid valve plunger 71 to the left thereby communicating air source 68 with air cylinder 64. Upon admission of air to the air cylinder chamber, piston 55 is driven to the right to situate the lenticular screen 14 in an abutting attitude with slide 33. Character images for the color corresponding to the lenticular screen abutting slide 33 then are projected upon the previously charged photoconductive thermoplastic slide to selectively discharge the slide in a line pattern parallel to the linear direction of the lenses forming the screen and at a density equal to the lens density of the screen thereby permitting subsequent deformation of the photoconductive thermoplastic slide, when heated by strip heater 42, into a plurality of ripples having a spacing corresponding to the color component desired. After the slide has been exposed, the activating signal to solenoid 69 from computer 15 is terminated and biasing spring 72 returns valve 67 to a rightward position thereby venting air cylinder 64. Upon the venting of air cylinder 64, compressed spring 73 again drives plunger 63 and motor 48 to retract the lenticular screen from contact with slide 33.

A single slide suffices to receive character images in white and all three primary colors by the sequential exposure of a single slide utilizing the individual screens with computer 15 preferably storing information for various character images until a lenticular screen of the proper color is rotated into position. Thus the number of screen changes required to write information into each photoconductive thermoplastic slide is miminized by the storage of character information in computer 15. After the photoconductive thermoplastic slide is passed proximate heater 42 to enable the electrostatic forces on the surface of the slide to deform the slide, slide 33 is cooled and forwarded to the projection system of FIG. 2 to produce the color display.

The projection system of FIG. 2 preferred for transducing color information from the ripples formed by the projection of the character images of cathode ray tube 11 through lenticular screens 14 onto photoconductive thermoplastic slide 33 generally comprises a lamp source 79, a lens system depicted generally by reference numeral 80, and a display screen 82. A polychromic light beam containing at least the primary colors required for the color display is produced by lamp 79 and is focused by a condensing lens 83 upon a first masking member 84 having a number of vertically extending green filter strips 85 which pass green light only and a number of spaced parallel magenta filter strips 86 extending at right angles to and optically overlying the green filter strips 85. The intersections of strips 85 and 86 provide a plurality of rectangular opaque areas 87 while a plurality of rectangular transparent areas 88 are provided intermediate the spaced green and magenta filter strips. Magenta filter strips 86 extend in a direction parallel to the ripples formed in slide 33 due to red and blue character images impinging upon the slide utilizing the color information writing apparatus of FIG. 1 while green filter strips 85 extend in a direction parallel to the ripples formed in slide 33 due to selective exposure of the slide with green character images.

The light transmitted through masking member 84 is focused by a lens system 89 on a second masking member 90 after being transmitted through previously deformed photoconductive thermoplastic slide 33. The second masking means is identical to the first and comprises orthogonally arranged green and magenta filter strips 85 and 86, respectively, extending parallel to the green and magenta filter strips of first masking member 84. Opaque areas 87 are formed at the overlap of the green and magenta filter strips while transparent areas 88 exist at the voids between adjacent strips.

In aligning the masking members, transparent areas 88 of first masking member 84 is imaged upon the opaque area 87 on the output mask 90. Green area 85 of the input mask 84 is imaged on the magenta area 86 of the output mask 90 and the magenta area 86 of the input mask is imaged on the green area 85 of the output mask. Thus, when slide 33 is undeformed, light from transparent area 88 is intercepted by the opaque area 87. Light passing the green area 85 is imaged upon and intercepted by magenta area 86. Likewise, the light passing the magenta area 86 is intercepted by the green area 85 and no light is transmitted to the screen 82 by projection lens 91.

If the slide 33 is deformed by a green character only, the white light passed by opening 88 of the input mask is diffracted along the green strip and falls on green areas 85 of the output mask to transmit green light to the area of screen 82. The green light passed by the green area 85 of the input filter is diffracted from magenta area 86 of output mask 90 to transparent areas 88 of the output mask and is transmitted as green light to the screen while magenta light passed by area 86 of the input filter is diffracted from green area 85 to opaque areas 87 of the output mask and is intercepted.

If slide 33 is deformed by a red character only, light is diffracted horizontally as viewed in FIG. 2. The white light passed by area 88 is diffracted so that the blue portion of the spectrum is intercepted by the first opaque areas 87 horizontally displaced from the opaque area on which the zero order or undiffracted white light is intercepted and the red light passes through the second magenta area out from the opaque area on which the undiffracted white light is intercepted. The green light passed by area 85 of the input mask 84 is diffracted from the magenta area 86 on which it is imaged originally to opaque areas 87 and is not transmitted to the screen 82. The light passed by magenta area 86 of the input mask 84 is diffracted from the green area 85 by an amount so that the red portion of the spectrum is passed through the second transparent areas out from the green area 85.

In a similar manner if a blue character only is impressed on slide 33 the white light passed by opening 88 is diffracted horizontally from opaque area 87 of the output mask 90 by an amount so that the red is intercepted by the first opaque areas 87 and blue light passes through the magenta areas 86 adjacent the opaque area on which the undiffracted white light was intercepted. Again the green light passed by area 85 of the input mask is diffracted along the magenta strip and is intercepted. The magenta light passed by area 86 of the input mask is diffracted horizontally from green area 85 by such an amount that the blue portion thereof passes through the transparent areas 88 adjacent green areas 87 with the red portion of the magenta light being intercepted by green areas 87.

When a white character image is written upon slide 33, transparent areas 88, magenta areas 86 and green areas 85 of imput mask 84 are imaged upon the transparent areas 88, magenta areas 86 and green areas 85, respectively, of output mask 90 and white light is projected upon screen 82. A more complete understanding of this and other projection systems suitably utilized for color displays can be obtained with reference to the previously mentioned Glenn Pat. No. 3,270,613.

Although a solid transparent slide is preferred for it utilization with the projection system of FIG. 2, an opaque and/or liquid light deformable medium can be employed in other types of known projection systems such as the projection system disclosed in U.S. Pat. No. 3,093,705, issued to W. E. Glenn and assigned to the assignee of the present invention. Similarly light darkenable mediums such as silver halide, Kalvar or photochromic materials can be utilized for light sensitive medium 13. The darkenable medium is selectively exposed in the color information writing apparatus of FIG. 1 and forwarded to the projection system of FIG. 2 to modulate the intensity of light rays projected through the selectively darkened medium by the variable light transmission characteristics of the selectively darkened medium. Thus while a deformed medium such as photoconductive thermoplastic effects a phase modulation of light rays passing therethrough to produce a color display, a selectively darkened medium produces a color display by a modulation of intensity of the light rays passing therethrough. The identical projection system utilized with light phase modulating mediums also can serve to produce color displays when the color information is written upon light intensity modulating mediums.

A triangularly shaped lenticular screen preferred for utilization in the color information writing apparatus of this invention is depicted in enlarged form in FIGS. 3 and 4, and generally comprises triangularly shaped lenses 95 formed integrally upon the face of a transparent substrate 96, such as Lucite, by pressing a heated copper form (not shown) into the face of the substrate. The density of the triangular lenses per inch of lenticular screens 14 principally is determined by the character resolution desired for the color display with the triangular lens spacing being very fine relative to the size of the least resolvable element to be recorded on slide 33. Once the dimension of the least resolvable element for a particular display has been determined, a triangular lens density of approximately four lines per element dimension generally is required for color production.

Thus in a specific instance when a 2" × 2" photoconductive thermoplastic slide was employed for the display of alphabetical letters having a dimension of one-seventieth the size of the slide, e.g. one-seventieth of 2""or approximately 30 mils, the least resolvable element was determined to be the width of the strokes forming the alphabetical letters, or approximately one-tenth the character dimension, e.g. 3 mils. Using four lines per least resolvable element for proper color production, a triangular lens density of 1200 lines per inch for green and red was found sufficient to define the character display with clarity. A triangular lens density of 900 lines per inch was employed for the blue screen with the spacing variation between the blue and the red screens principally being determined by the center wavelength of the blue and red light to be passed. A 500 mesh screen having triangular lenses lineated both in the horizontal and in the vertical direction to diffract impinging light into horizontal and vertical line patterns was found suitable for writing white characters.

In writing color information on slide 33, an image produced by cathode ray tube 11 is focused by lens 12 upon the triangularly shaped lenses of lenticular screen 14 which lenses refract the impinging light rays 97 into a line pattern 98 having a spacing equal to the density of the triangular lenses and a direction parallel to the linear direction of the lenses. The edges of the triangular lenses are pressed firmly against slide 33 by air driven piston 63 and the sloping sides of the triangular lenses focus the impinging light approximately midpoint within the slide. In one specific instance, 1200 lines per inch of triangular lenses having an interior angle of 120° between sloping sides of the triangular lenses have been found to focus impinging light rays approximately 12 microns below the surface of an abutting slide. Because the depth of Lucite substrate 96 within which the triangularly shaped lenticular lenses are formed does not have any effect upon the focusing action of the triangular lenses, a substantial substrate thickness is preferred for screen rigidity.

The configuration of the triangularly shaped lenses forming lenticular screens 14 whereby only the vertices of the triangular lenses are pressed against the charged surface of the photoconductive thermoplastic slide 33 assures that a minimum transfer of charge from the slide to the screen is accomplished. Furthermore the sharply sloping sides of the triangularly shaped screen insures that a maximum amount of the light impinging upon the screen is refracted into the line patterns thereby effectively magnifying the output of cathode ray tube 11.

A second lenticular type screen suitable for use with a color display system using a light sensitive recording material is depicted in FIG. 5 and generally consists of a Lucite substrate 96 which has been deformed, preferably by a hot metallic form pressing against its face, into a series of sinusoidally shaped lenticular lenses 102. The sloping sides of the sinusoidal lenses function in a manner similar to that of the triangularly shaped lenses depicted in FIG. 3 and operate to focus light rays impinging on the lens into a line pattern 98 spaced at a distance equal to the period of the sinusoidal lenses. However because sinusoidal lenses do not have sharp vertices characteristics of triangularly shaped lenses, the sinusoidal lenses have a greater bearing surface against a charged photoconductive thermoplastic slide and therefore a greater transfer of charge from the slide to the sinusoidally shaped screen is possible. A second deficiency in sinusoidally shaped screens resides in the fact that unrefracted light transmission can occur at the gently sloping maxima 104 of the sinusoidal lenses to form a less intense line pattern of light 106 intermediate the focused line pattern of light. Thus not only is some light intensity lost by the nonfocusing action at the maxima of the sinusoids, but there also are formed small areas of light interference which deteriorate the quality of the projected display.

In FIG. 6 there is depicted a masking screen 107 suitable for forming a line pattern of light upon a light sensitive medium. The masking screen generally consists of a plurality of slits or transparent sections 108 interspersed with the plurality of opaque sections 109. The width of opaque sections 109 e.g. the distance between adjacent transparent sections 108 of masking screen 107, again is principally determined by the character resolution desired with spacing variations between the red and blue screens being determined principally by the center wavelengths of the red and blue light to be passed. No focusing action is accomplished by the masking screen of FIG. 6 and therefore an increased intensity in the character images of cathode ray tube 11 is required to obtain an exposure of slide 33 equivalent to the exposure obtained utilizing the focusing lenses of FIGS. 3 and 5. However the opaque sections do function to split light from cathode ray tube 11 into a line pattern of light operative upon slide 33 to form a cycle of modulation having a disposition e.g. either a spacing or an attitude, dependent upon the color component desired.

While several examples of this invention have been shown and described, it will be apparent to those skilled in the art that many changes may be made without departing from this invention in its broader aspects; and therefore the appended claims are intended to cover all such changes and modifications as fall within the true spirit and scope of this invention.

I claim:

1. A color display system comprising an image source, a deformable light sensitive medium, means for projecting said image source upon said deformable light sensitive medium, means positioned intermediate said image source and said deformable light sensitive medium for splitting light from said image source into a line pattern of light rays having a spacing corresponding to a particular color component desired, said line pattern of light rays irradiating said light sensitive medium to form cycles of deformations having a spacing corresponding to the spacing of said irradiating light rays, and means for selectively projecting light upon said cycles of deformation to display said image color.

2. A color display system according to claim 1 wherein said means for splitting light from said image source are abutting said deformable light sensitive medium.

3. A color display system according to claim 2 wherein one surface of said light splitting means is lenticulated to focus light rays impinging thereon, said lenticulated surface being disposed in an abutting attitude relative to said deformable light sensitive medium during exposure thereof by said image source.

4. As apparatus for writing color information on a deformable light modulating medium according to claim 1 wherein said means for splitting light from said image source is a lenticular screen of triangularly shaped lenses, the apexes of said triangularly shaped lenses being disposed in an abutting attitude relative to said deformable light sensitive medium.

5. A method of producing a color display comprising homogeneously charging the surface of a deformable light sensitive medium, projecting a first image upon said deformable light sensitive medium, disposing a first lenticular screen in an abutting attitude relative to said deformable light sensitive medium to form a first line pattern of light impinging upon said deformable light sensitive medium from said first image to selectively discharge said medium in a first pattern, terminating said first image, substituting a second lenticular screen in an abutting attitude relative to said deformable light sensitive medium, the lenticules of said second screen having an angular orientation differing from the angular orientation of the lenticules in said first screen, projecting a second image through said second lenticular screen to form a second line pattern of light impinging upon said deformable light sensitive medium to selectively discharge said medium in a second pattern, removing said second lenticular screen from contact with said deformable light sensitive medium, developing said light sensitive medium to form cycles of deformations having an angular orientation corresponding to the line patterns of discharge along said medium, and selectively projecting light through said cycles of deformations to display said images in a color corresponding to the angular orientations of the cycles of deformations produced by said images in said deformable light sensitive medium.

6. A system for writing color information upon a deformable light sensitive medium comprising an image source, means for charging the surface of said deformable light sensitive medium, means for projecting said image source upon said deformable light sensitive medium, a plurality of light splitting means, means responsive to a first color component to position a first said light splitting means intermediate said image source and said deformable light sensitive medium at a location abutting said light sensitive medium, said light splitting means focusing light from said image source into a line pattern of light operative upon said light sensitive medium to selectively discharge said deformable light sensitive medium in a line pattern having a disposition dependent upon said first color component desired, means for moving said first light splitting means from intermediate said image source and said light deformable light sensitive medium, and means responsive to a second color component to position a second light splitting means intermediate said image source and said deformable light sensitive medium at a location abutting said light sensitive medium, said second light splitting means focusing light from said image source into a line pattern of light operative upon said light sensitive medium to selectively discharge said deformable light sensitive medium in a line pattern having a disposition differing from said first line pattern of discharge, means for moving said second light splitting means from intermediate said image source and said deformable light sensitive medium and means for developing cycles of deformation in said deformable light sensitive medium corresponding to the line patterns of discharge produced along said medium by said light splitting means.

7. A system for writing color information upon a light sensitive medium according to claim 6 wherein said first line pattern of discharge is at an angular attitude relative to said second line pattern of discharge, and said light splitting means is characterized by at least one lenticulated surface in contact with said deformable light sensitive medium during selective exposure thereof.

8. A system for writing color information upon a light sensitive medium according to claim 6 wherein said first line pattern of discharge is at a parallel attitude relative to said second line pattern of discharge, said first line pattern of discharge having a density differing from the density of said second line pattern of discharge.

9. A color display system comprising an image source, a deformable light sensitive medium, means for projecting a first image from said image source upon said deformable light sensitive medium, first means positionable intermediate said image source and light sensitive medium for splitting said first image from said image source into a first line pattern of light rays having a spacing corresponding to a first color component desired, said first line pattern of light rays irradiating said light sensitive medium to form a first cycle of deformations having a spacing corresponding to the spacing of said first line pattern of light rays, second means positionable intermediate said image source and said light sensitive medium for splitting a second image from said image source into a second line pattern of light rays having a spacing corresponding to a second color component desired, said second line pattern of light rays irradiating said light sensitive medium to form a second cycle of deformations having a spacing corresponding to the spacing of said second line pattern of light rays, said spacing of said first cycle of deformations differing from the spacing of said second cycle of deformations, and means for projecting light through said cycles of deformations to display the images from said image source in color.